(12) United States Patent
Perkins et al.

(10) Patent No.: US 7,961,393 B2
(45) Date of Patent: Jun. 14, 2011

(54) SELECTIVELY ABSORPTIVE WIRE-GRID POLARIZER

(75) Inventors: Raymond T. Perkins, Orem, UT (US); Mark A. Davis, Springville, UT (US); Bin Wang, Orem, UT (US); Eric W. Gardner, Eagle Mountain, UT (US)

(73) Assignee: Moxtek, Inc., Orem, UT (US)

( * ) Notice: Subject to any disclaimer, the term of this patent is extended or adjusted under 35 U.S.C. 154(b) by 817 days.

(21) Appl. No.: 11/767,353

(22) Filed: Jun. 22, 2007

(65) Prior Publication Data

US 2008/0278811 A1    Nov. 13, 2008

Related U.S. Application Data

(63) Continuation-in-part of application No. 11/005,927, filed on Dec. 6, 2004, now Pat. No. 7,570,424.

(51) Int. Cl.
*G02B 5/30* (2006.01)
(52) U.S. Cl. .................................. 359/485.05; 359/576
(58) Field of Classification Search .................. 359/486
See application file for complete search history.

(56) References Cited

U.S. PATENT DOCUMENTS

| | | | |
|---|---|---|---|
| 2,224,214 A | 12/1940 | Brown | |
| 2,237,567 A | 4/1941 | Land | |
| 2,287,598 A | 6/1942 | Brown | |
| 2,391,451 A | 12/1945 | Fischer | |
| 2,403,731 A | 7/1946 | MacNeille | |
| 2,605,352 A | 7/1952 | Fishcer | |
| 2,748,659 A | 6/1956 | Geffcken et al. | |
| 2,813,146 A | 11/1957 | Glenn | |
| 2,815,452 A | 12/1957 | Mertz | |
| 2,887,566 A | 5/1959 | Marks | |
| 3,046,839 A | 7/1962 | Bird et al. | |
| 3,084,590 A | 4/1963 | Glenn, Jr. | |
| 3,202,039 A | 8/1965 | Lang et al. | |
| 3,235,630 A | 2/1966 | Doherty et al. | |
| 3,291,550 A | 12/1966 | Bird et al. | |
| 3,291,871 A | 12/1966 | Francis | |
| 3,293,331 A | 12/1966 | Doherty | |
| 3,436,143 A | 4/1969 | Garrett | |
| 3,479,168 A | 11/1969 | Bird et al. | |
| 3,536,373 A | 10/1970 | Bird et al. | |

(Continued)

FOREIGN PATENT DOCUMENTS

AU        2003267964        12/2003

(Continued)

OTHER PUBLICATIONS

Zhang et al., "A broad-angle polarization beam splitter based on a simple dielectric periodic structure." Optices Express, Oct. 29, 2007, 6 pages, vol. 15, No. 22.

(Continued)

*Primary Examiner* — Lee Fineman
(74) *Attorney, Agent, or Firm* — Thorpe North & Western LLP

(57) ABSTRACT

A selectively absorptive, mulitlayer wire-grid polarizer for polarizing incident light includes a stack of thin film layers disposed over a substrate, including a wire-grid array of elongated metal elements having a period less than half the wavelength of the light. One of the layers can include a thin film layer with a refractive index greater than a refractive index of the substrate. One of the thin film layers can include a dielectric array of non-metal elements. One of the layers includes a material that is optically absorptive to the incident light.

33 Claims, 3 Drawing Sheets

U.S. PATENT DOCUMENTS

| | | |
|---|---|---|
| 3,566,099 A | 2/1971 | Makas |
| 3,627,431 A | 12/1971 | Komarniski |
| 3,631,288 A | 12/1971 | Rogers |
| 3,653,741 A | 4/1972 | Marks |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmüller |
| 3,877,789 A | 4/1975 | Marie |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,068,260 A | 1/1978 | Ohneda et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,308,079 A | 12/1981 | Venables et al. |
| 4,441,791 A | 4/1984 | Hornbeck |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,515,443 A | 5/1985 | Bly |
| 4,532,619 A | 7/1985 | Sugiyama et al. |
| 4,560,599 A | 12/1985 | Regan |
| 4,679,910 A | 7/1987 | Efron et al. |
| 4,688,897 A | 8/1987 | Grinberg et al. |
| 4,701,028 A | 10/1987 | Clerc et al. |
| 4,711,530 A | 12/1987 | Nakanowatari et al. |
| 4,712,881 A | 12/1987 | Shurtz et al. |
| 4,724,436 A | 2/1988 | Johansen et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,763,972 A | 8/1988 | Papuchon et al. |
| 4,795,233 A | 1/1989 | Chang |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,870,649 A | 9/1989 | Haven et al. |
| 4,893,905 A | 1/1990 | Efron |
| 4,895,769 A | 1/1990 | Land et al. |
| 4,904,060 A | 2/1990 | Grupp |
| 4,913,529 A | 4/1990 | Goldenberg et al. |
| 4,915,463 A | 4/1990 | Barbee, Jr. |
| 4,939,526 A | 7/1990 | Tsuda |
| 4,946,231 A | 8/1990 | Pistor |
| 4,966,438 A | 10/1990 | Mouchart et al. |
| 4,991,937 A | 2/1991 | Urino |
| 5,029,988 A | 7/1991 | Urino |
| 5,039,185 A | 8/1991 | Uchida et al. |
| 5,061,050 A | 10/1991 | Ogura |
| 5,087,985 A | 2/1992 | Kitaura et al. |
| 5,092,774 A | 3/1992 | Milan |
| 5,113,285 A | 5/1992 | Franklin et al. |
| 5,115,305 A | 5/1992 | Baur |
| 5,122,887 A | 6/1992 | Mathewson |
| 5,122,907 A | 6/1992 | Slocum |
| 5,139,340 A | 8/1992 | Okumura |
| 5,157,526 A | 10/1992 | Kondo et al. |
| 5,177,635 A | 1/1993 | Keilmann |
| 5,196,926 A | 3/1993 | Lee |
| 5,196,953 A | 3/1993 | Yeh et al. |
| 5,198,921 A | 3/1993 | Aoshima et al. |
| 5,204,765 A | 4/1993 | Mitsui et al. |
| 5,206,674 A | 4/1993 | Puech et al. |
| 5,216,539 A | 6/1993 | Boher et al. |
| 5,222,907 A | 6/1993 | Katabuchi et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,267,029 A | 11/1993 | Kurematsu |
| 5,279,689 A | 1/1994 | Shvartsman |
| 5,295,009 A | 3/1994 | Barnik et al. |
| 5,298,199 A | 3/1994 | Hirose et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,387,953 A | 2/1995 | Minoura et al. |
| 5,391,091 A | 2/1995 | Nations |
| 5,401,587 A | 3/1995 | Montohiro et al. |
| 5,422,756 A | 6/1995 | Weber |
| 5,430,573 A | 7/1995 | Araujo et al. |
| 5,436,761 A | 7/1995 | Kamon |
| 5,455,589 A | 10/1995 | Huguenin et al. |
| 5,466,319 A | 11/1995 | Zager et al. |
| 5,477,359 A | 12/1995 | Okazaki |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,499,126 A | 3/1996 | Abileah et al. |
| 5,504,603 A | 4/1996 | Winker et al. |
| 5,506,704 A | 4/1996 | Broer et al. |
| 5,508,830 A | 4/1996 | Imoto et al. |
| 5,510,215 A | 4/1996 | Prince et al. |
| 5,513,023 A | 4/1996 | Fritz et al. |
| 5,513,035 A | 4/1996 | Miyatake et al. |
| 5,517,356 A | 5/1996 | Araujo et al. |
| 5,535,047 A | 7/1996 | Hornbeck |
| 5,548,427 A | 8/1996 | May |
| 5,555,186 A | 9/1996 | Sjopua |
| 5,557,343 A | 9/1996 | Yamagishi |
| 5,559,634 A | 9/1996 | Weber |
| 5,570,213 A | 10/1996 | Ruiz et al. |
| 5,570,215 A | 10/1996 | Omae et al. |
| 5,574,580 A | 11/1996 | Ansley |
| 5,576,854 A | 11/1996 | Schmidt et al. |
| 5,579,138 A | 11/1996 | Sannohe et al. |
| 5,594,561 A | 1/1997 | Blanchard |
| 5,600,383 A | 2/1997 | Hornbeck |
| 5,609,939 A | 3/1997 | Petersen et al. |
| 5,612,820 A | 3/1997 | Schrenk et al. |
| 5,614,035 A | 3/1997 | Nadkarni |
| 5,619,352 A | 4/1997 | Koch et al. |
| 5,619,356 A | 4/1997 | Kozo et al. |
| 5,620,755 A | 4/1997 | Smith, Jr. et al. |
| 5,626,408 A | 5/1997 | Heynderickx et al. |
| 5,638,197 A | 6/1997 | Gunning, III et al. |
| 5,652,667 A | 7/1997 | Kurogane |
| 5,658,060 A | 8/1997 | Dove |
| 5,686,979 A | 11/1997 | Weber et al. |
| 5,706,063 A | 1/1998 | Hong |
| 5,706,131 A | 1/1998 | Ichimura et al. |
| 5,719,695 A | 2/1998 | Heimbuch |
| 5,731,246 A | 3/1998 | Bakeman et al. |
| 5,748,368 A | 5/1998 | Tamada et al. |
| 5,748,369 A | 5/1998 | Yokota |
| 5,751,388 A | 5/1998 | Larson |
| 5,751,466 A | 5/1998 | Dowling et al. |
| 5,767,827 A | 6/1998 | Kobayashi et al. |
| 5,798,819 A | 8/1998 | Hattori et al. |
| 5,808,795 A | 9/1998 | Shimomura et al. |
| 5,826,959 A | 10/1998 | Atsuchi |
| 5,826,960 A | 10/1998 | Gotoh et al. |
| 5,828,489 A | 10/1998 | Johnson et al. |
| 5,833,360 A | 11/1998 | Knox et al. |
| 5,838,403 A | 11/1998 | Jannson et al. |
| 5,841,494 A | 11/1998 | Hall |
| 5,844,722 A | 12/1998 | Stephens et al. |

| | | | | | | |
|---|---|---|---|---|---|---|
| 5,886,754 | A | 3/1999 | Kuo | 6,490,017 | B1 | 12/2002 | Huang et al.
| 5,890,095 | A | 3/1999 | Barbour et al. | 6,496,239 | B2 | 12/2002 | Seiberle
| 5,898,521 | A | 4/1999 | Okada | 6,496,287 | B1 | 12/2002 | Seiberle et al.
| 5,899,551 | A | 5/1999 | Neijzen et al. | 6,511,183 | B2 | 1/2003 | Shimizu et al.
| 5,900,976 | A | 5/1999 | Handschy et al. | 6,520,645 | B2 | 2/2003 | Yamamoto et al.
| 5,907,427 | A | 5/1999 | Scalora et al. | 6,532,111 | B2 | 3/2003 | Kurtz et al.
| 5,912,762 | A | 6/1999 | Li et al. | 6,547,396 | B1 | 4/2003 | Svardal et al.
| 5,914,818 | A | 6/1999 | Tejada et al. | 6,580,471 | B2 | 6/2003 | Knox
| 5,917,562 | A | 6/1999 | Woodgate et al. | 6,583,930 | B1 | 6/2003 | Schrenk et al.
| 5,918,961 | A | 7/1999 | Ueda | 6,585,378 | B2 | 7/2003 | Kurtz et al.
| 5,930,050 | A | 7/1999 | Dewald | 6,624,936 | B2 | 9/2003 | Kotchick et al.
| 5,943,171 | A | 8/1999 | Budd et al. | 6,643,077 | B2 | 11/2003 | Magarill et al.
| 5,958,345 | A | 9/1999 | Turner et al. | 6,654,168 | B1 | 11/2003 | Borrelli
| 5,965,247 | A | 10/1999 | Jonza et al. | 6,661,475 | B1 | 12/2003 | Stahl et al.
| 5,969,861 | A | 10/1999 | Ueda et al. | 6,661,484 | B1 | 12/2003 | Iwai et al.
| 5,973,833 | A | 10/1999 | Booth et al. | 6,665,119 | B1 | 12/2003 | Kurtz et al.
| 5,978,056 | A | 11/1999 | Shintani et al. | 6,666,556 | B2 | 12/2003 | Hansen et al.
| 5,982,541 | A | 11/1999 | Li et al. | 6,669,343 | B2 | 12/2003 | Shahzad et al.
| 5,986,730 | A | 11/1999 | Hansen et al. | 6,698,891 | B2 | 3/2004 | Kato
| 5,991,075 | A | 11/1999 | Katsuragawa et al. | 6,704,469 | B1 | 3/2004 | Xie et al.
| 5,991,077 | A | 11/1999 | Carlson et al. | 6,710,921 | B2 | 3/2004 | Hansen et al.
| 6,005,918 | A | 12/1999 | Harris et al. | 6,714,350 | B2 | 3/2004 | Silverstein et al.
| 6,008,871 | A | 12/1999 | Okumura | 6,721,096 | B2 | 4/2004 | Bruzzone et al.
| 6,008,951 | A | 12/1999 | Anderson | 6,746,122 | B2 | 6/2004 | Knox
| 6,010,121 | A | 1/2000 | Lee | 6,764,181 | B2 | 7/2004 | Magarill et al.
| 6,016,173 | A | 1/2000 | Crandall | 6,769,779 | B1 | 8/2004 | Ehrne et al.
| 6,018,841 | A | 2/2000 | Kelsay et al. | 6,781,640 | B1 | 8/2004 | Hunag
| 6,049,428 | A | 4/2000 | Khan et al. | 6,785,050 | B2 | 8/2004 | Lines et al.
| 6,053,616 | A | 4/2000 | Fujimori et al. | 6,788,461 | B2 | 9/2004 | Kurtz et al.
| 6,055,103 | A | 4/2000 | Woodgate et al. | 6,805,445 | B2 | 10/2004 | Silverstein et al.
| 6,056,407 | A | 5/2000 | Iinuma et al. | 6,809,864 | B2 | 10/2004 | Martynov et al.
| 6,062,694 | A | 5/2000 | Oikawa et al. | 6,809,873 | B2 | 10/2004 | Cobb
| 6,075,235 | A | 6/2000 | Chun | 6,811,274 | B2 | 11/2004 | Olczak
| 6,081,312 | A | 6/2000 | Aminaka et al. | 6,813,077 | B2 | 11/2004 | Borrelli et al.
| 6,081,376 | A | 6/2000 | Hansen et al. | 6,816,290 | B2 | 11/2004 | Mukawa
| 6,082,861 | A | 7/2000 | Dove et al. | 6,821,135 | B1 | 11/2004 | Martin
| 6,089,717 | A | 7/2000 | Iwai | 6,823,093 | B2 | 11/2004 | Chang et al.
| 6,096,155 | A | 8/2000 | Horden et al. | 6,829,090 | B2 | 12/2004 | Katsumata et al.
| 6,096,375 | A | 8/2000 | Ouderkirk et al. | 6,844,971 | B2 | 1/2005 | Silverstein et al.
| 6,108,131 | A | 8/2000 | Hansen et al. | 6,846,089 | B2 | 1/2005 | Stevenson et al.
| 6,122,103 | A | 9/2000 | Perkins et al. | 6,859,303 | B2 | 2/2005 | Wang et al.
| 6,122,403 | A | 9/2000 | Rhoads | 6,876,784 | B2 | 4/2005 | Nikolov et al.
| 6,124,971 | A | 9/2000 | Ouderkirk et al. | 6,896,371 | B2 | 5/2005 | Shimizu et al.
| 6,141,075 | A | 10/2000 | Ohmuro et al. | 6,897,926 | B2 | 5/2005 | Mi et al.
| 6,147,728 | A | 11/2000 | Okumura et al. | 6,899,440 | B2 | 5/2005 | Bierhuizen
| 6,172,813 | B1 | 1/2001 | Tadic-Galeb et al. | 6,900,866 | B2 | 5/2005 | Kurtz et al.
| 6,172,816 | B1 | 1/2001 | Tadic-Galeb et al. | 6,909,473 | B2 | 6/2005 | Mi et al.
| 6,181,386 | B1 | 1/2001 | Knox | 6,920,272 | B2 | 7/2005 | Wang
| 6,181,458 | B1 | 1/2001 | Brazas, Jr. et al. | 6,922,287 | B2 | 7/2005 | Wiki et al.
| 6,185,041 | B1 | 2/2001 | TadicGaleb et al. | 6,926,410 | B2 | 8/2005 | Weber et al.
| 6,208,463 | B1 | 3/2001 | Hansen et al. | 6,927,915 | B2 | 8/2005 | Nakai
| 6,215,547 | B1 | 4/2001 | Ramanugan et al. | 6,934,082 | B2 | 8/2005 | Allen et al.
| 6,234,634 | B1 | 5/2001 | Hansen et al. | 6,943,941 | B2 | 9/2005 | Flagello et al.
| 6,243,199 | B1 | 6/2001 | Hansen et al. | 6,947,215 | B2 | 9/2005 | Hoshi
| 6,247,816 | B1 | 6/2001 | Cipolla et al. | 6,954,245 | B2 | 10/2005 | Mi et al.
| 6,249,378 | B1 | 6/2001 | Shimamura et al. | 6,972,906 | B2 | 12/2005 | Hasman et al.
| 6,250,762 | B1 | 6/2001 | Kuijper | 6,976,759 | B2 | 12/2005 | Magarill et al.
| 6,251,297 | B1 | 6/2001 | Komuro et al. | 6,981,771 | B1 | 1/2006 | Arai et al.
| 6,282,025 | B1 | 8/2001 | Huang et al. | 7,009,768 | B2 | 3/2006 | Sakamoto
| 6,288,840 | B1 | 9/2001 | Perkins et al. | 7,013,064 | B2 | 3/2006 | Wang
| 6,291,797 | B1 | 9/2001 | Koyama et al. | 7,023,512 | B2 | 4/2006 | Kurtz et al.
| 6,310,345 | B1 | 10/2001 | Pittman et al. | 7,023,602 | B2 | 4/2006 | Aastuen et al.
| 6,339,454 | B1 | 1/2002 | Knox | 7,025,464 | B2 | 4/2006 | Beeson et al.
| 6,340,230 | B1 | 1/2002 | Bryars et al. | 7,046,422 | B2 | 5/2006 | Kimura et al.
| 6,345,895 | B1 | 2/2002 | Maki et al. | 7,046,441 | B2 | 5/2006 | Huang et al.
| 6,348,995 | B1 | 2/2002 | Hansen et al. | 7,046,442 | B2 | 5/2006 | Suganuma
| 6,375,330 | B1 | 4/2002 | Mihalakis | 7,050,233 | B2 | 5/2006 | Nikolov et al.
| 6,390,626 | B2 | 5/2002 | Knox | 7,050,234 | B2 | 5/2006 | Gage et al.
| 6,398,364 | B1 | 6/2002 | Bryars | 7,075,722 | B2 | 7/2006 | Nakai
| 6,406,151 | B1 | 6/2002 | Fujimori | 7,085,050 | B2 | 8/2006 | Florence
| 6,409,525 | B1 | 6/2002 | Hoelscher et al. | 7,099,068 | B2 | 8/2006 | Wang et al.
| 6,411,749 | B2 | 6/2002 | Teng et al. | 7,113,335 | B2 | 9/2006 | Sales
| 6,424,436 | B1 | 7/2002 | Yamanaka | 7,116,478 | B2 | 10/2006 | Momoki et al.
| 6,426,837 | B1 | 7/2002 | Clark et al. | 7,131,737 | B2 | 11/2006 | Silverstein et al.
| 6,447,120 | B1 | 9/2002 | Hansen et al. | 7,142,363 | B2 | 11/2006 | Sato et al.
| 6,452,724 | B1 | 9/2002 | Hansen et al. | 7,142,374 | B2 | 11/2006 | Nikolov et al.
| 6,460,998 | B1 | 10/2002 | Watanabe | 7,142,375 | B2 | 11/2006 | Nikolov et al.
| 6,473,236 | B2 | 10/2002 | Tadic-Galeb et al. | 7,155,073 | B2 | 12/2006 | Momoki et al.
| 6,486,997 | B1 | 11/2002 | Bruzzone et al. | 7,158,302 | B2 | 1/2007 | Chiu et al.

| | | |
|---|---|---|
| 7,159,987 B2 | 1/2007 | Sakata |
| 7,177,259 B2 | 2/2007 | Nishi et al. |
| 7,184,115 B2 | 2/2007 | Mi et al. |
| 7,185,984 B2 | 3/2007 | Akiyama |
| 7,213,920 B2 | 5/2007 | Matsui et al. |
| 7,220,371 B2 | 5/2007 | Suganuma |
| 7,221,420 B2 | 5/2007 | Silverstein et al. |
| 7,221,501 B2 | 5/2007 | Flagello et al. |
| 7,227,684 B2 | 6/2007 | Wang et al. |
| 7,230,766 B2 | 6/2007 | Rogers |
| 7,234,816 B2 | 6/2007 | Bruzzone et al. |
| 7,236,655 B2 | 6/2007 | Momoki et al. |
| 7,255,444 B2 | 8/2007 | Nakashima et al. |
| 7,256,938 B2 | 8/2007 | Barton et al. |
| 7,268,946 B2 | 9/2007 | Wang |
| 7,306,338 B2 | 12/2007 | Hansen et al. |
| 7,375,887 B2 | 5/2008 | Hansen |
| 7,414,784 B2 | 8/2008 | Mi et al. |
| 7,561,332 B2 | 7/2009 | Little et al. |
| 7,570,424 B2 | 8/2009 | Perkins et al. |
| 7,619,816 B2 | 11/2009 | Deng et al. |
| 7,630,133 B2 | 12/2009 | Perkins |
| 7,670,758 B2 | 3/2010 | Wang et al. |
| 7,692,860 B2 | 4/2010 | Sato et al. |
| 7,722,194 B2 | 5/2010 | Amako et al. |
| 7,789,515 B2 | 9/2010 | Hansen |
| 7,813,039 B2 | 10/2010 | Perkins |
| 2001/0006421 A1 | 7/2001 | Parriaux |
| 2001/0022687 A1 | 9/2001 | Takahashi et al. |
| 2001/0053023 A1 | 12/2001 | Kameno et al. |
| 2002/0001128 A1 | 1/2002 | Moseley et al. |
| 2002/0003661 A1 | 1/2002 | Nakai |
| 2002/0015135 A1 | 2/2002 | Hanson |
| 2002/0040892 A1 | 4/2002 | Koyama et al. |
| 2002/0122235 A1 | 9/2002 | Kurtz et al. |
| 2002/0167727 A1 | 11/2002 | Hansen et al. |
| 2002/0176166 A1 | 11/2002 | Schuster |
| 2002/0181824 A1 | 12/2002 | Huang et al. |
| 2002/0191286 A1 | 12/2002 | Gale et al. |
| 2003/0058408 A1 | 3/2003 | Magarill et al. |
| 2003/0072079 A1 | 4/2003 | Silverstein et al. |
| 2003/0081178 A1 | 5/2003 | Shimizu et al. |
| 2003/0081179 A1 | 5/2003 | Pentico et al. |
| 2003/0117708 A1 | 6/2003 | Kane |
| 2003/0156325 A1 | 8/2003 | Hoshi |
| 2003/0161029 A1 | 8/2003 | Kurtz et al. |
| 2003/0180024 A1 | 9/2003 | Edlinger |
| 2003/0193652 A1 | 10/2003 | Pentico et al. |
| 2003/0202157 A1 | 10/2003 | Pentico et al. |
| 2003/0218722 A1 | 11/2003 | Tsao et al. |
| 2003/0223118 A1 | 12/2003 | Sakamoto |
| 2003/0223670 A1 | 12/2003 | Nikolov et al. |
| 2004/0008416 A1 | 1/2004 | Okuno |
| 2004/0042101 A1 | 3/2004 | Wang |
| 2004/0047039 A1 | 3/2004 | Wang et al. |
| 2004/0047388 A1 | 3/2004 | Wang et al. |
| 2004/0051928 A1 | 3/2004 | Mi |
| 2004/0070829 A1 | 4/2004 | Kurtz et al. |
| 2004/0071425 A1 | 4/2004 | Wang |
| 2004/0095637 A1 | 5/2004 | Nikolov et al. |
| 2004/0120041 A1 | 6/2004 | Silverstein et al. |
| 2004/0125449 A1 | 7/2004 | Sales |
| 2004/0165126 A1 | 8/2004 | Ooi et al. |
| 2004/0174596 A1 | 9/2004 | Umeki |
| 2004/0201889 A1 | 10/2004 | Wang et al. |
| 2004/0201890 A1 | 10/2004 | Crosby |
| 2004/0218270 A1 | 11/2004 | Wang |
| 2004/0227994 A1 | 11/2004 | Ma et al. |
| 2004/0233362 A1 | 11/2004 | Kashima |
| 2004/0258355 A1 | 12/2004 | Wang et al. |
| 2004/2407777 | 12/2004 | Woodgate et al. |
| 2005/0008839 A1 | 1/2005 | Cramer et al. |
| 2005/0018308 A1 | 1/2005 | Cassarley et al. |
| 2005/0045799 A1 | 3/2005 | Deng et al. |
| 2005/0046941 A1 | 3/2005 | Satoh et al. |
| 2005/0078374 A1 | 4/2005 | Tairo et al. |
| 2005/0084613 A1 | 4/2005 | Wang et al. |
| 2005/0088739 A1 | 4/2005 | Chiu et al. |
| 2005/0122587 A1 | 6/2005 | Ouderkirk et al. |
| 2005/0128567 A1 | 6/2005 | Wang et al. |
| 2005/0128587 A1 | 6/2005 | Suganuma |
| 2005/0152033 A1 | 7/2005 | Kang et al. |
| 2005/0179995 A1 | 8/2005 | Nikolov et al. |
| 2005/0180014 A1 | 8/2005 | Nikolov et al. |
| 2005/0181128 A1 | 8/2005 | Nikolov et al. |
| 2005/0190445 A1 | 9/2005 | Fukuzaki |
| 2005/0195485 A1 | 9/2005 | Hirai et al. |
| 2005/0201656 A1 | 9/2005 | Nikolov et al. |
| 2005/0206847 A1 | 9/2005 | Hansen et al. |
| 2005/0213043 A1 | 9/2005 | Nakashima et al. |
| 2005/0259324 A1 | 11/2005 | Flagello et al. |
| 2005/0271091 A1 | 12/2005 | Wang |
| 2005/0275944 A1 | 12/2005 | Wang et al. |
| 2005/0277063 A1 | 12/2005 | Wang et al. |
| 2006/0001969 A1 | 1/2006 | Wang et al. |
| 2006/0061862 A1 | 3/2006 | Mi et al. |
| 2006/0072074 A1 | 4/2006 | Matsui et al. |
| 2006/0072194 A1 | 4/2006 | Lee |
| 2006/0087602 A1 | 4/2006 | Kunisada et al. |
| 2006/0092513 A1 | 5/2006 | Momoki |
| 2006/0103810 A1 | 5/2006 | Ma et al. |
| 2006/0113279 A1 | 6/2006 | Little |
| 2006/0118514 A1 | 6/2006 | Little et al. |
| 2006/0119937 A1 | 6/2006 | Perkins |
| 2006/0127829 A1 | 6/2006 | Deng et al. |
| 2006/0187416 A1 | 8/2006 | Ouchi et al. |
| 2006/0192960 A1 | 8/2006 | Renes et al. |
| 2006/0215263 A1 | 9/2006 | Mi et al. |
| 2006/0238715 A1 | 10/2006 | Hirata et al. |
| 2006/0268207 A1 | 11/2006 | Tan et al. |
| 2007/0146644 A1 | 6/2007 | Mi et al. |
| 2007/0183035 A1 | 8/2007 | Asakawa et al. |
| 2007/0195676 A1 | 8/2007 | Hendriks et al. |
| 2007/0217008 A1 | 9/2007 | Wang et al. |
| 2007/0223349 A1 | 9/2007 | Shimada et al. |
| 2007/0242187 A1 | 10/2007 | Yamaki et al. |
| 2007/0242228 A1 | 10/2007 | Chen et al. |
| 2007/0242352 A1 | 10/2007 | MacMaster |
| 2007/0297052 A1 | 12/2007 | Wang et al. |
| 2008/0037101 A1 | 2/2008 | Jagannathan et al. |
| 2008/0038467 A1 | 2/2008 | Jagannathan et al. |
| 2008/0055549 A1 | 3/2008 | Perkins |
| 2008/0055719 A1 | 3/2008 | Perkins |
| 2008/0055720 A1 | 3/2008 | Perkins |
| 2008/0055721 A1 | 3/2008 | Perkins |
| 2008/0055723 A1 | 3/2008 | Perkins |
| 2008/0266662 A1 | 10/2008 | Perkins |
| 2008/0278811 A1 | 11/2008 | Perkins |
| 2008/0316599 A1 | 12/2008 | Wang et al. |
| 2009/0040607 A1 | 2/2009 | Amako et al. |
| 2009/0053655 A1 | 2/2009 | Deng et al. |
| 2009/0109377 A1 | 4/2009 | Sawaki et al. |
| 2010/0103517 A1 | 4/2010 | Davis et al. |
| 2010/0239828 A1 | 9/2010 | Cornaby |
| 2010/0328768 A1 | 12/2010 | Lines |
| 2010/0328769 A1 | 12/2010 | Perkins |
| 2011/0080640 A1 | 4/2011 | Kaida et al. |

FOREIGN PATENT DOCUMENTS

| | | |
|---|---|---|
| CH | 0296391 | 2/1954 |
| CN | 03815026.3 | 8/2005 |
| CN | 1692291 | 11/2005 |
| CN | 03814105.1 | 11/2005 |
| DE | 4164157 | 7/1925 |
| DE | 296391 | 2/1950 |
| DE | 3707984 A1 | 9/1988 |
| DE | 103 27 963 | 1/2005 |
| DE | 10341596 | 4/2005 |
| DE | 102004041222 | 3/2006 |
| EP | 0317910 A1 | 5/1989 |
| EP | 0336334 B1 | 10/1989 |
| EP | 0349309 B1 | 1/1990 |
| EP | 0357946 B1 | 3/1990 |
| EP | 407830 B1 | 1/1991 |
| EP | 416157 A1 | 3/1991 |
| EP | 0488544 A1 | 6/1992 |
| EP | 0507445 A2 | 10/1992 |
| EP | 0518111 A1 | 12/1992 |

| | | |
|---|---|---|
| EP | 0543061 A1 | 5/1993 |
| EP | 566 004 | 10/1993 |
| EP | 0588937 B1 | 3/1994 |
| EP | 0606940 A2 | 7/1994 |
| EP | 0349144 B1 | 9/1994 |
| EP | 0634674 A2 | 1/1995 |
| EP | 0670506 A1 | 9/1995 |
| EP | 0521591 B1 | 10/1995 |
| EP | 0731456 | 9/1996 |
| EP | 0744634 A2 | 11/1996 |
| EP | 1239308 | 11/2002 |
| JP | 56156815 | 12/1981 |
| JP | 58-042003 | 3/1983 |
| JP | 61122626 | 6/1986 |
| JP | 10028675 | 1/1989 |
| JP | 02 -308106 | 12/1990 |
| JP | 2308106 | 12/1990 |
| JP | 3005706 | 1/1991 |
| JP | 403084502 | 4/1991 |
| JP | 3126910 | 5/1991 |
| JP | 04 366916 | 6/1991 |
| JP | 4-12241 | 1/1992 |
| JP | 4331913 | 11/1992 |
| JP | 06174907 | 12/1992 |
| JP | 5134115 | 5/1993 |
| JP | 5288910 | 11/1993 |
| JP | 5341234 | 12/1993 |
| JP | 6138413 | 5/1994 |
| JP | 6202042 | 7/1994 |
| JP | 7005316 | 1/1995 |
| JP | 7072428 | 3/1995 |
| JP | 7-146469 | 6/1995 |
| JP | 3501299 | 8/1995 |
| JP | 7202266 | 8/1995 |
| JP | 7294850 | 11/1995 |
| JP | 7294851 | 11/1995 |
| JP | 7318861 | 12/1995 |
| JP | 9015534 | 1/1997 |
| JP | 9090122 | 4/1997 |
| JP | 9090129 | 4/1997 |
| JP | 9178943 | 7/1997 |
| JP | 09-507926 | 8/1997 |
| JP | 9212896 | 8/1997 |
| JP | 9288211 | 11/1997 |
| JP | 10-003078 | 1/1998 |
| JP | 10073722 A | 3/1998 |
| JP | 10084502 | 3/1998 |
| JP | 10-153706 | 6/1998 |
| JP | 10-260403 | 9/1998 |
| JP | 10- 268301 | 10/1998 |
| JP | 11-014814 | 1/1999 |
| JP | 1-164819 | 3/1999 |
| JP | 11064794 | 3/1999 |
| JP | 11142650 | 5/1999 |
| JP | 11-174396 | 7/1999 |
| JP | 11237507 | 8/1999 |
| JP | 11-258603 | 9/1999 |
| JP | 11-306581 | 11/1999 |
| JP | 2000-147487 | 5/2000 |
| JP | 2000284117 | 10/2000 |
| JP | 2001074935 | 3/2001 |
| JP | 2004157159 | 6/2004 |
| JP | 2004309903 | 11/2004 |
| JP | 20054513547 | 5/2005 |
| JP | 2005195824 | 7/2005 |
| JP | 2005534981 | 11/2005 |
| JP | 2006047813 | 2/2006 |
| JP | 2006133402 | 5/2006 |
| JP | 2006201540 | 8/2006 |
| KR | 2003-0079268 | 10/2003 |
| KR | 10-2003-0090021 | 11/2003 |
| KR | 10-2004-0046137 | 6/2004 |
| KR | 10-2005-0017871 | 2/2005 |
| KR | 10-0707083 | 4/2007 |
| SU | 1283685 | 1/1987 |
| SU | 1781659 A1 | 12/1992 |
| WO | WO96/15474 | 5/1996 |
| WO | WO97/01788 | 1/1997 |
| WO | WO0070386 | 11/2000 |
| WO | WO 01/89677 | 4/2001 |
| WO | WO 02/21205 | 3/2002 |
| WO | WO 02/077588 | 10/2002 |
| WO | WO03/054619 | 7/2003 |
| WO | WO03/069381 | 8/2003 |
| WO | WO03/102652 | 12/2003 |
| WO | WO03/107046 | 12/2003 |
| WO | WO2004013684 | 2/2004 |
| WO | WO 2004/019020 | 3/2004 |
| WO | WO2004/019070 | 3/2004 |
| WO | WO2004/072692 | 8/2004 |
| WO | WO2005019503 | 3/2005 |
| WO | WO2005/065182 | 7/2005 |
| WO | WO2005079233 | 9/2005 |
| WO | WO2005/101112 | 10/2005 |
| WO | WO2005/123277 | 12/2005 |
| WO | WO2006/014408 | 2/2006 |
| WO | WO2006/036546 | 4/2006 |

OTHER PUBLICATIONS

Compact Disc Audio, http://hyperphusics.phy-astr.gsu.edu/hbase/audio/cdplay.html, Nov. 26, 2007.
Robinson et al., "Wide Field of View Compensation Scheme for Cube Polarizing Beam Splitters." SID 03 Digest, pp. 1-4, www.colorlink.com.
Baur, "A new type of beam splitting polarizer cube," Meadowlark Optics, 2005, pp. 1-9.
ProFlux, www.moxtek.comm pp. 1-4.
Pentico, Clark et al., "New, High Performance, Durable Polarizers for Projection Displays." SID 01 Digest, 2001, pp. 1287-1289.
Brummelaar et al., "Beam combining optical components," Chara Technical Report, Jan. 5, 1998, pp. TR61-1 to TR 61-17, No. 61.
Bruzzone, et al.,"High-performance LCoS optical engine using cartesian polarizer technlogy," SID 03 Digest, 2003, pp. 1-4.
Fritsch, et al., "A liquid-crystal phase modulator for large-screen projection." IEEE, Sep. 1989, pp. 1882-1887, vol. 36, No. 9.
Deguzman et al., "Stacked subwavelength gratings as circular polarization filters." Applied Optics, Nov. 1, 2001, pp. 5731-5737, vol. 40, No. 31.
Tyan et al., "Polarizing beam splitter based on the anisotropic spectral reflectivity characteristic of form-birefringent multilayer gratings." Optics Letters, May 15, 1996, pp. 761-763, vol. 21, No. 10.
Tamada et al., "Aluminum-wire grid polarizer for a compact magneto-optic pickup device." 2 pages.
Lloyd William Taylor, Manual of Advanced Undergraduate Experiments in Physics, p. 302 (1959).
Flanders, Application of $\approx$ 100 Å linewidth structures fabricated by shadowing technique$^{a)}$, J. Vac. Sci. Technol., 19(4), Nov./Dec. 1981.
Kuta et al. "Coupled-wave analysis of lamellar metal transmission gratings for the visible and the infrared," J. Opt. Soc. Am. A/vol. 12, No. 5/May 1995.
Lockbihler et al. "Diffraction from highly conducting wire gratings of arbitrary cross-section," Journal of Modern Optics, 1993, vol. 40, No. 7, pp. 1273-1298.
Novak et al., "Far infrared polarizing grids for use at cryogenic temperatures," Applied Optics, Aug. 15, 1989/vol. 28, No. 15, pp. 3425-3427.
Auton et al, "Grid Polarizers for Use in the Near Infrared," Infrared Physics, 1972, vol. 12, pp. 95-100.
Stenkamp et al, "Grid polarizer for the visible spectral region," SPIE vol. 2213 pp. 288-296.
Handbook of Optics, 1978, pp. 10-68-10-77.
Handbook of Optics vol. II, $2^{nd}$ Edition, pp. 3.32-3.35.
Glytsis et al, "High-spatial-frequency binary and multilevel stairstep gratings: polatization-selective mirrors and broadband antireflection surfaces," Applied Optics Aug. 1, 1992 vol. 31, No. 22 pp. 4459-4470.
Auton, "Infrared Transmission Polarizers by Photolithography,"Applied Optics Jun. 1967 vol. 6, No. 6, pp. 1023-1027.
Haggans et al., "Lamellar gratings as polarization components for specularly reflected beams," Journal of Modern Optics, 1993, vol. 40, No. 4, pp. 675-686.
Nordin et al., "Micropolarizer array for infrared imaging polarimetry", J. Op. Soc. Am. A. vol. 16 No. 5/May 1999.

Bird et al., "The Wire Grid as a Near-Infrared Polarizer," J. Op. Soc. Am. vol. 50 No. 9 (1960).

Optics 9th Edition, pp. 338-339 (1980).

Whitbourn et al, "Phase shifts in transmission line models of thin periodic metal grids," Applied Optics Aug. 15, 1989 vol. 28, No. 15, pp. 3511-3515.

Enger et al, "Optical elements with ultrahigh spatial-frequency surface corrugations," Applied Optics Oct. 15, 1983, vol. 22, No. 20 pp. 3220-3228.

Knop, "Reflection Grating Polarizer for the Infrared," Optics Communications vol. 26, No. 3, Sep. 1978.

Hass et al, "Sheet Infrared Transmission Polarizers," Applied Optics Aug. 1965, vol. 4, No. 8 pp. 1027-1031.

Flanders, "Submicron periodicity gratings as artificial anisotropic dielectrics," Appl. Phys. Lett. 42 (6), Mar. 15, 1983, pp. 492-494.

Li Li et al, "Visible broadband, wide-angle, thin-film multilayer polarizing beam splitter," Applied Optics May 1, 1996, vol. 35, No. 13, pp. 2221-2224.

Sonek et al., "Ultraviolet grating polarizers," J. Vac. Sci. Technol., 19(4), Nov./Dec. 1981, pp. 921-923.

N.M. Ceglio, Invited Review "Revolution in X-Ray Optics", J. X-Ray Science & Tech. 1, 7-78 (1989).

Dainty, et al, "Measurements of light scattering by characterized random rough surface", Waves in Random Media 3 (1991).

DeSanto et al, "Rough surface scattering", Waves in Random Media 1 (1991).

Lavin, "Specular Reflection", Monographs on App. Opt. No. 2.

Zamzicchi et al., "Corrosion Inhibitors for Aluminum Films" David Sarnoff Research Center, Princeton, NJ 08543-5300.

Moshier et al. "The Corrosion and Passively of Aluminum Exposed to Dilute Sodium Sulfate Solutions." Corrosion Science vol. 27. No. 8 pp. 785-801 1987.

Scandurra, et al. "Corrosion Inhibition of Al Metal in Microelectronic Devices Assemble in Plastic Packages." Journal of the Electrochemical Society, 148 (8) B289-B292 (2001).

Takano, Kuniyoshi et al. "Cube polarizers by the use of metal particles in anodic alumina films." Applied Optics, vol. 33, No. 16, 3507-3512, Jun. 1, 1994.

Lopez, et al. "Wave-plate polarizing beam splitter based on a form-birefringent multilayer grating." Optics Letters, vol. 23, No. 20, pp. 1627-1629, Oct. 15, 1998.

Chen, J. et al. "Optimum film compensation modes for TN and VA LCDs" SID 98 Digest, pp. 315-318, 1998.

Richter, Ivan et al. "Design considerations of form birefringent microstructures." Applied Optics, vol. 34, No. 14, pp. 2421-2429, May 10, 1995.

Tyan, Rong-Chung et al. "Design, fabrication, and characterization of form-birefringent multilayer polarizing beam splitter." Optical Society of America, vol. 14, No. 7, pp. 1627-1636, Jul. 1997.

Ho, G H et al. "The mechanical-optical properties of wire-grid type polarizer in projection display system." SID 02 Digest, pp. 648-651, 2002.

Kostal, Hubert, NanoTechnology "Using advanced lithography to pattern nano-optic devices" www.solid-state.com, Sep. 2005, p. 26 and 29.

Kostal, Hubert "Nano-optics: robust, optical devices for demanding applications" Military & Aerospace Electronics, Jul. 2005, 6 pages.

Kostal, Hubert "Nano-optic devices enable integrated fabrication" www.laserfocuswold.com, Jun. 2004 pp. 155, 157-159.

Wang, Jian et al. "Free-Space nano-optical devices and integration: design, fabrication, and manufacturing" Bell Labs Technical Journal, 2005 pp. 107-127, vol. 10, No. 3.

Wang et al. "Diffractive optics: nanoimprint lithography enables fabrication of subwavelength optics" LaserFocusWorld, http://lfw.pennnet.com/Articles/Article_Dispaly.cf... Apr. 19, 2006, 6 pages.

Wang et al. "High-performance nanowire-grid polarizers" Optical Society of America 2005, pp. 195-197, vol. 30, No. 2.

Wang et al. "Fabrication of a new broadband waveguide polarizer with a double-layer 190 nm period metal-gratings using nanoimprint lithography" Journal Vac. Sci. Technology B, Nov./Dec. 1999, pp. 2957-2960, vol. 17, No. 6.

Savas et al. "Achromatic interferometric lithography for 100-nm-period gratings and grids" Journal Vac. Sci. Technology B, Nov./Dec. 1995, pp. 2732-2735, vol. 13, No. 6.

Haisma et al. "Mold-assisted nanolithography: a process for reliable pattern replication" Journal Vac. Sci. Technology B, Nov./Dec. 1996, pp. 4124-4128, vol. 14, No. 6.

Wang et al. "High-performance large-area ultra-broadband (UV to IR) nanowire-grid polarizers and polarizing beam-splitters" Proc. of SPIE 2005, pp. 1-12, vol. 5931.

Wang et al. "Monolithically integrated isolators based on nanowire-grid polarizers" IEEE, Photonics Technology Letters, Feb. 2005, pp. 396-398, vol. 17, No. 2.

Deng et al. "Multiscale structures for polarization control by using imprint and UV lithography" Proc. of SPIE, 2005, pp. 1-12. vol. 6003.

Kostal et al. "MEMS Meets Nano-optics The marriage of MEMES and nano-optics promises a new and viable platform for tunable optical filters" www.fiberoptictechnology.net, Fiber Optic Technology, Nov. 2005, pp. 8-13.

Kostal et al. "Adding parts for a greater whole" SPIE's oeMagazine, May 2003, pp. 24-26.

Deng et al. "Wideband antireflective polarizers based on integrated diffractive multilayer microstructures" Optics Letters, Feb. 1, 2006, pp. 344-346, vol. 31., No. 3.

Chen, et al. "Novel polymer patterns formed by lithographically induced self-assembly (LISA)", American Chemical Society, Jan. 2005, pp. 818-821, vol. 21, No. 3.

Park, et al. "Nano-optics redefine rules for optical processing" NanoOptic Corp, 3 pages.

Maystre & Dainty, Modern analysis of scattering phenomena porceedings from INternational workshop held at Domaine deTournon, Aix en Provence,s France Sep. 5-8, 1990, 2 pages.

Wang, et al., "Innovatic High-Performance Nanowrie-Grid Polarizers and integrated Isolators," IEEE Journal of Selected Topics in Quantum Electronics, pp. 241-253, vol. 11 No. 1 Jan./Feb. 2005.

Maystre & Dainty, "Modern Analysis of Scattering Phenomena", Proceeding from International Workshop held at Domaine deTournon, Aix en Provence, France Sep. 5-8, 1990.

Sonek et al, "Ultraviolet grating polarizers", 1981 American Vacuum Society, J.Vac.Sci.Technol., 19(4), Nov./Dec. 1981, pp. 921-923.

SELECTIVELY ABSORPTIVE WIRE-GRID POLARIZER

PRIORITY CLAIM

This is a continuation-in-part of U.S. patent application Ser. No. 11/005,927, filed on Dec. 6, 2004 now U.S. Pat. No. 7,570,424; which is herein incorporated by reference.

RELATED APPLICATIONS

This is related to U.S. patent application Ser. No. 11/767, 336, filed Jun. 22, 2007, entitled "Reflection-Repressed Wire-grid Polarizer"; which is herein incorporated by reference.

BACKGROUND

1. Field of the Invention

The present invention relates generally to wire-grid polarizers for the visible and near visible spectrum which are selectively absorptive.

2. Related Art

A wire grid polarizer (WGP) is an array of parallel wires disposed on the surface of a substrate, such as glass. Usually wire-grid polarizers are a single, periodic array of wires on the substrate. The grid acts as a diffraction grating when the period of the wires is greater than about half of the wavelength of light. The grid acts as a polarizer when the period of the wires is less than about half the wavelength of light.

While it is desirable for a WGP to transmit all of the light of one polarization and reflect all of the other polarization, no polarizer is perfect. Real WGPs will transmit some of the light of both polarizations and will reflect some of the light of both polarizations. When light is incident on the surface of a transparent material, such as a sheet of glass, a small amount of the light is reflected. For example, at normal incidence, about 4% of the incident light is reflected from each surface of the glass.

In some applications, it is also desirable for a WGP to transmit all of the light of one polarization while removing all, or most of, the light of the other polarization from the optical system.

It has been suggested to dispose a film under a WGP, or between the wires and the substrate, to move the first diffraction order to shorter wavelengths in order to improve performance in part of the visible spectrum, such as blue light. See U.S. Pat. No. 6,122,103. The film has an index of refraction less than that of the substrate. It has also been suggested to etch into either the substrate or underlying layer to further reduce the effective refractive index under the wire grid. See U.S. Pat. No. 6,122,103. It has been further suggested to form each wire as a composite with alternating metal and dielectric layers. See U.S. Pat. No. 6,532,111.

SUMMARY

It has been recognized that it would be advantageous to develop a wire-grid polarizer capable of selectively absorbing one polarization orientation of the light. In addition, it has been recognized that it would be advantageous to develop a polarizer that is easy to incorporate into many optical systems without significant changes to the optical design, and that is inorganic and durable. In addition, it has been recognized that a wire-grid polarizer can act as a metal for reflecting one polarization state and act as a thin film of lossy dielectric for the other polarization state. Thus, it has been recognized that form birefringence and effective index of refraction can be applied to a wire-grid polarizer. It has further been recognized that a thin film which acts as a lossy dielectric can be designed and configured to preferentially absorb energy in one polarization. In addition, it has been recognized that a wire-grid polarizer can be treated as a thin film layer, and incorporated into an optical stack. Briefly, and in general terms, the invention is directed to a selectively absorptive wire-grid polarizer device for polarizing incident light and selectively absorbing one polarization. A polarizing wire-grid layer is disposed over a substrate and has an array of parallel metal wires with a period less than half the wavelength of the incident light. A dielectric layer is disposed over the substrate and includes a dielectric material. An absorptive layer is disposed over the substrate and includes a material which is optically absorptive of the incident light such that one polarization is substantially absorbed. The absorptive layer also has a refractive index different than the refractive index of the dielectric layer.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1A:
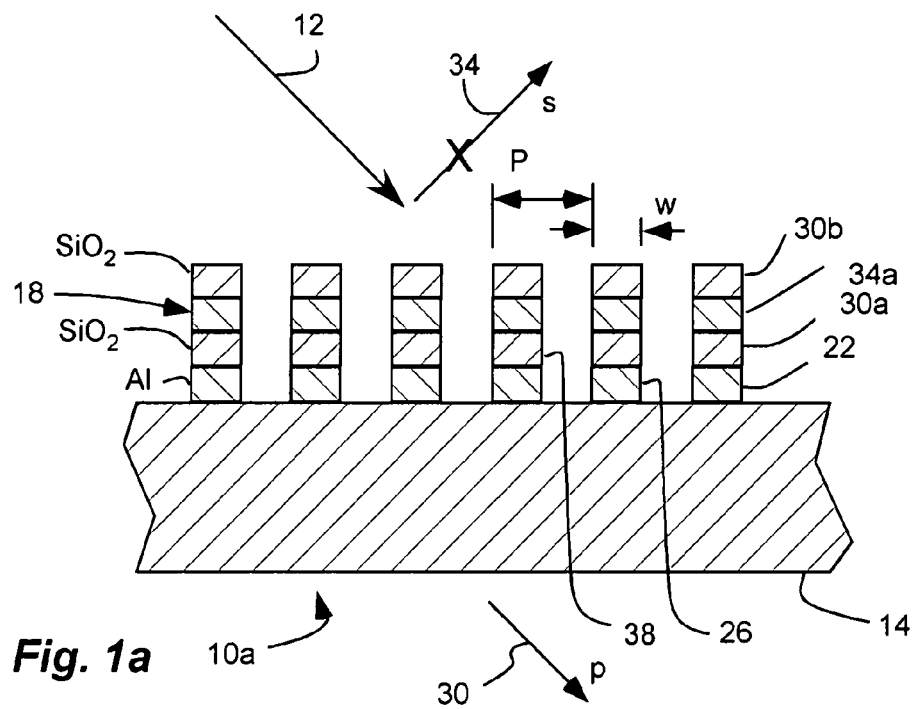
FIG. 1a is a cross-sectional side schematic view of a selectively absorptive, multilayer wire grid polarizer in accordance with an embodiment of the present invention (the figures are not to scale and features are shown greatly exaggerated for clarity)

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

It has been recognized that, for one polarization of light, a wire-grid polarizer substantially acts as a metal that reflects the light (or one polarization thereof), while for the other polarization of the light, the wire-grid polarizer substantially acts as a thin film of lossy dielectric that transmits the light (or another polarization thereof). Thus, it has been recognized that two concepts, namely form birefringence and effective index of refraction, can be applied to improve the performance of the polarizer.

A wire-grid polarizer is not typically considered an example of form birefringence. Generally, birefringence means that a material has a different index of refraction for different polarizations. Birefringence is very common in crystalline materials, such as quartz, and in stretched polymers. Form birefringence refers to birefringence caused by the shape of a material.

When a material has variations in material properties, such as density, with the scale of the variation being smaller than the wavelength of light, the index of refraction is different from the index of uniform bulk material. There is an effective refractive index, which is the index that a uniform thin film would have that causes the same affect on light. The theoretical treatment of this effect is called effective medium theory. This phenomenon is used with dielectric materials to make such things as moth-eye antireflection coatings.

In addition, a wire-grid polarizer is not typically considered a thin film. In optics, both form birefringence and effective index are typically considered only for dielectric materials. It has been recognized, however, that treating a wire-grid polarizer as an equivalent birefringent thin film with effective indices of refraction allows one to consider it as an element in a thin film stack, and to use thin film design techniques with particular performance goals.

The present invention utilizes thin films in combination with a metallic wire grid polarizer to improve or, in other words, to engineer, the performance of the polarizer. Generally this may include films under and on top of the wire grid. Any one of these films may be uniform or a dielectric grid. The wire grid may be a composite grid, or have composite wires. Combining the wire grid with multiple layers of different material, and thus different refractive indices, can reduce reflection of the polarization that is desired to be transmitted. For example, a wire grid can be configured to transmit p polarized light. As discussed above, while it is desirable to transmit all the p polarized light, a typical wire grid will transmit some of both polarizations and reflect some of both polarizations. It has been found, however, that treating the wire grid as a birefringent thin film, and combining the wire grid with multiple thin films, reduces reflection of p polarized light.

In some applications, it is also desirable for a wire-grid polarizer to transmit all of the p polarized light while removing all, or most of, the s polarized light from an optical system, such as by absorbing the s polarized light as heat within the wire-grid polarizer. In this way, the wire-grid polarizer would behave substantially like the common polymer-based polarizers that have a wide variety of uses. This would make it easier to incorporate wire-grid polarizers into many optical systems without significant changes to the optical design. At the same time, many optical systems would benefit from the increase durability of an inorganic polarizer such as a wire-grid polarizer. Thus, a wire grid can be configured to poorly reflect s polarized light, or, in other words, to largely absorb the s polarized light rather than reflect it. This can be accomplished by combining the wire grid with multiple layers of different materials, certain of which have optical absorption characteristics. Therefore, whether the wire-grid is an efficient reflector of the s polarization, or is an absorber of s polarization, is a design choice. Either result can be affected by proper choice of dielectric films or grids either under or on top of the wire grid.

As illustrated in FIGS. 1a-4, selectively absorptive, multilayer wire-grid polarizer devices, indicated generally at 10a-e, respectively, are shown as exemplary implementations in accordance with the invention for polarizing incident light 12, or substantially separating one polarization state from an orthogonal polarization state, while absorbing one polarization state. Such devices are believed to have substantial utility in visible light applications, or for use with visible light in the range of approximately 400-700 nm (nanometers), or 0.4-0.7 μm (micrometers or microns). Such visible light applications can include projection display devices such as projectors. The multilayer wire-grid polarizer devices described herein can be utilized in various different capacities, such as polarizers, beam splitters, analyzers, etc. It is also believed that the devices herein have utility in near-visible applications, such as ultraviolet and/or infrared applications, or for use with light in the range of approximately 250-400 nm or 700-10,000 nm. Thus, the term "light" is used broadly herein to refer to visible light, ultraviolet light and infrared light, or electromagnetic waves in the range of 250-10,000 nm.

The polarizers 10a-e include a substrate 14 carrying or supporting a plurality or stack of film layers 18, including a wire grid or a wire grid layer 22. The substrate 14 can be transparent to the light being treated. For example, the substrate can be glass (Bk7). Other substrates can be quartz or plastic or fused silica. In addition, the substrate 14 can have a substantial thickness $t_s$ with respect to the remaining thin film layers. Furthermore, the substrate can have a refractive index (or index of refraction) $n_s$. For example, a glass substrate (Bk7) has a refractive index $n_s$ of 1.52 (at 550 nm). (It will be appreciated that the refractive index varies slightly with wavelength.)

The wire grid or wire grid layer 22 includes a wire-grid array of elongated metal elements or wires 26. The elements 26 have lengths longer than a wavelength of the light, and are located in a generally parallel arrangement with a period P less than half the wavelength of the light. Thus, for use with visible light, the elements 26 have a length larger than the wavelength of visible light, or greater than 700 nm (0.7 μm). The length, however, can be much longer. The elements 26 can have a center-to-center spacing, pitch or period P less than half the wavelength of visible light, or less than 350 nm (0.36 μm). In one aspect, the period P can be less than 200 nm for visible light applications. In another aspect, the period P can be less than 120 nm for visible light applications. The elements 26 can also have a width w in the range of 10 to 90% of the pitch or period. The elements 26 can also have a thickness or a height t less than the wavelength of the light, or less than 400 nm (0.4 μm) for visible light applications. In one aspect, the thickness can be less than 0.2 μm for visible light applications.

For ultra violet applications, the period P can be less than 200 nm. In one aspect, the period P can be less than 125 nm for ultra violet applications. For infrared applications, the period P can be less than 500 nm (but greater than 350 nm). In another aspect, the period P can be less than 5,000 nm for infrared applications. The elements 26, or the array, generally interact with the incident light to generally transmit a transmitted beam 30 having a substantially uniform and constant linear polarization state (such as p polarization). The s polarization which would normally reflect as reflected beam 34 is generally absorbed, as described in greater detail below. The elements generally transmit light with a first polarization state (p polarization), oriented locally orthogonal or transverse to the elements. It will be appreciated that the wire-grid polarizer will separate the polarization states of the light with a certain degree of efficiency, or some of both polarization states may be transmitted and/or absorbed. The remaining reflected beam can be reduced to 10% or less of the original amount of energy in that polarization.

The elements 26 or array can be formed on or over the substrate by photo-lithography. The elements 26 can be conductive, and can be formed of aluminum, silver, gold or copper. In addition, the elements are inorganic, and thus robust.

Figure 2:
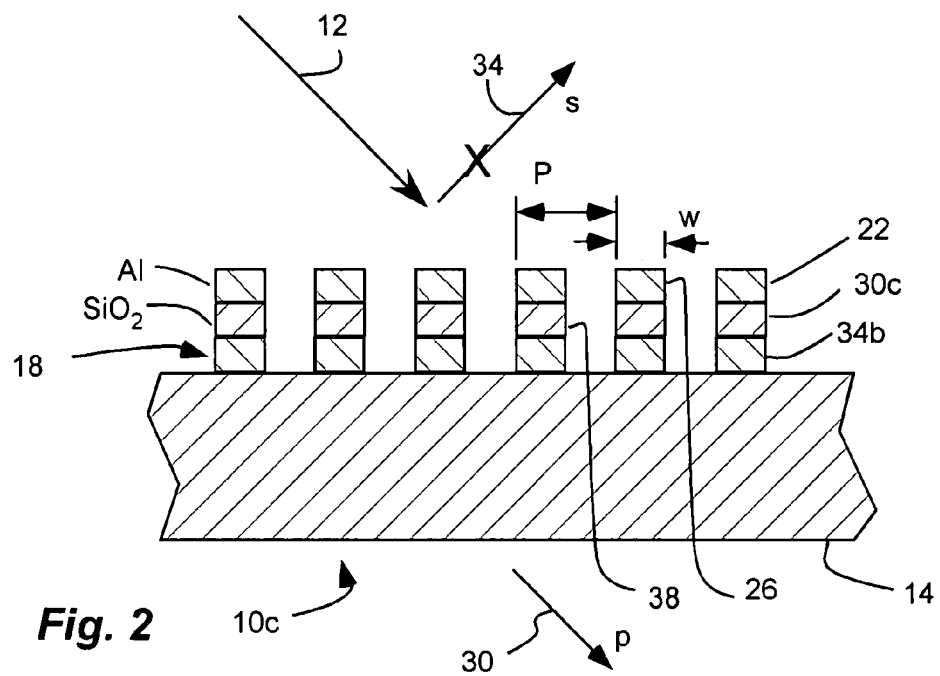
FIG. 2 is a cross-sectional side schematic view of another selectively absorptive, multilayer wire grid polarizer in accordance with another embodiment of the present invention (the figures are not to scale and features are shown greatly exaggerated for clarity)
Figure 3:
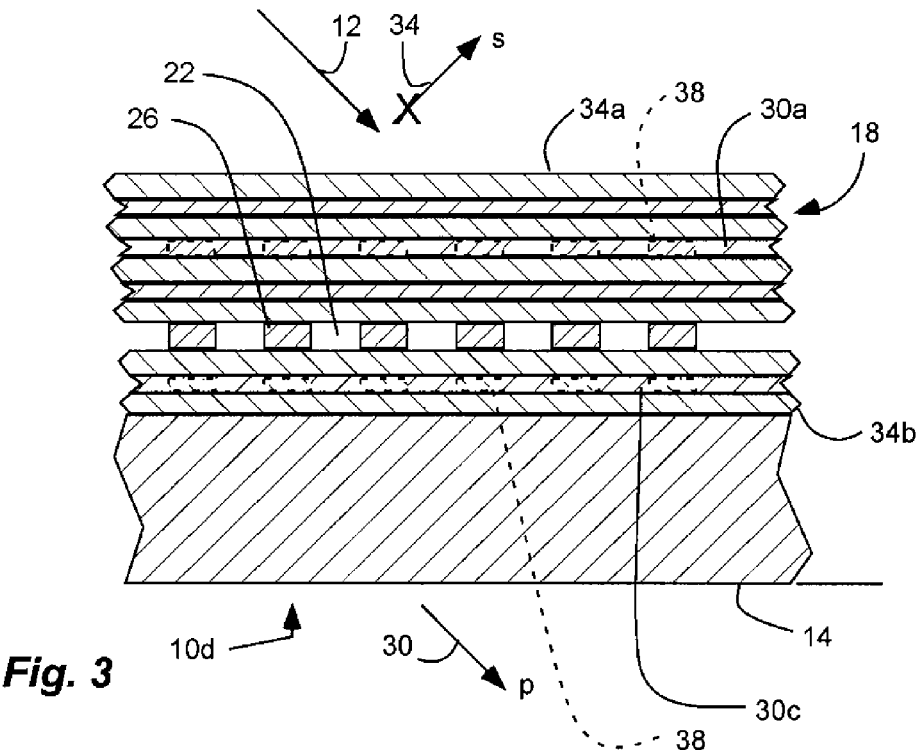
FIG. 3 is a cross-sectional side schematic view of another selectively absorptive, multilayer wire grid polarizer in accordance with another embodiment of the present invention (the figures are not to scale and features are shown greatly exaggerated for clarity)
Figure 4:
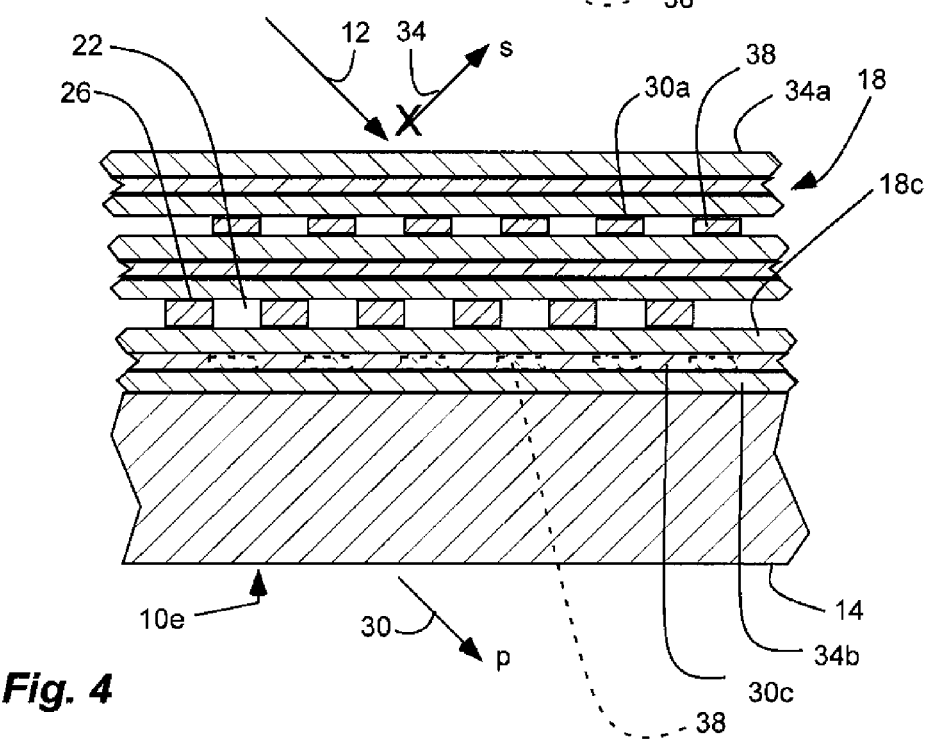
FIG. 4 is a cross-sectional side schematic view of another selectively absorptive, multilayer wire grid polarizer in accordance with another embodiment of the present invention (the figures are not to scale and features are shown greatly exaggerated for clarity)

The plurality of film layers 18 can include layers under and/or over the wire grid layer 22. Thus, one or more layers can be disposed between the substrate 14 and the wire grid layer 22, as shown in FIGS. 2, 3 and 4. In addition, one or more layers can be disposed over the wire grid layer 22, as shown in FIGs. 1a, 1b, 3 and 4. The layers 18 can be formed of different materials, or materials different than the substrate 14, and even from each other. Thus, the layers 18 can have refractive indices n different than the refractive index $n_s$ of the substrate 14. Furthermore, it has been found that at least one of the layers having a refractive index $n_{1-3}$ greater than the refractive index $n_s$ of the substrate 14 decreases reflection of the p polarized light. Thus, in accordance with one aspect of the invention, the polarizer 10d or 10e has at least one film layer disposed between the substrate 14 and the wire grid layer 22, and the film layer has a refractive index $n_1$ greater than the refractive index $n_s$ of the substrate 14. In accordance with another aspect of the invention, the polarizer can have at least two film layers, or at least three thin film layers.

Figure 1B:
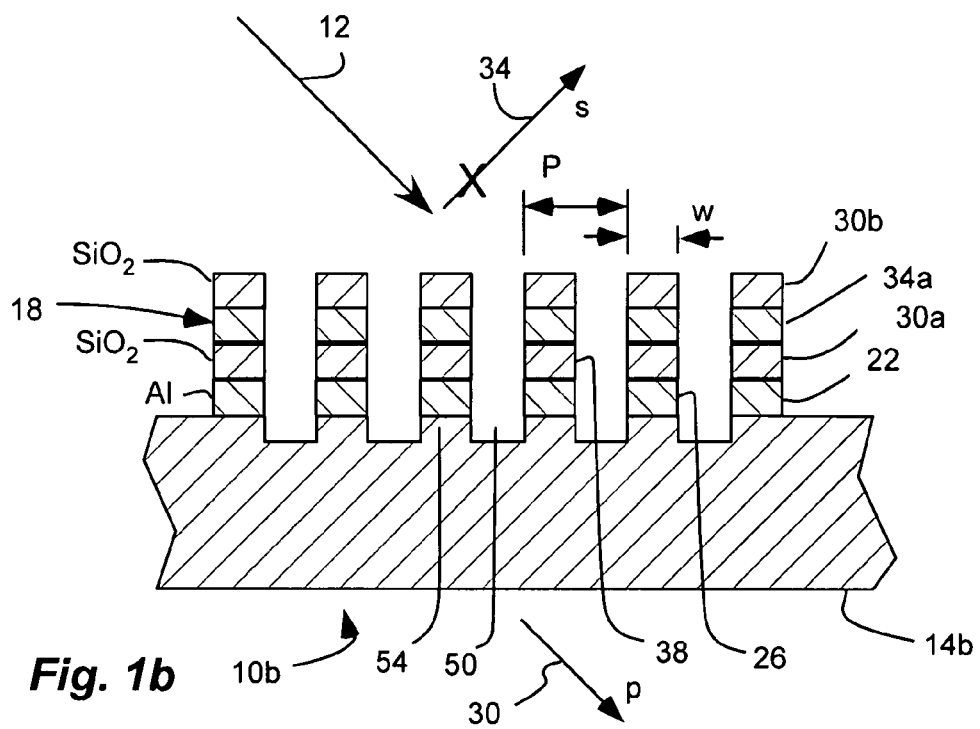
FIG. 1b is a cross-sectional side schematic view of another selectively absorptive, multilayer wire grid polarizer in accordance with another embodiment of the present invention (the figures are not to scale and features are shown greatly exaggerated for clarity)

One or more of the layers can be a dielectric layer 30a-c. In one aspect, the dielectric layer 30a and 30b can be disposed over the wire grid layer 22, as shown in FIGS. 1a and 1b. In another aspect, the dielectric layer 30c can be disposed under the wire-grid layer 22, or between the wire-grid layer 22 and the substrate, as shown in FIG. 2. The dielectric layer can be optically transmissive to the incident light.

In addition, one of the layers can be an absorptive layer 34a and 34b. In one aspect, the absorptive layer 34a can be disposed over the wire-grid layer 22, as shown in FIGS. 1a and 1b. In another aspect, the absorptive layer 34b can be disposed under the wire-grid layer 22, or between the wire-grid layer 22 and the substrate 14, as shown in FIG. 2. The absorptive layer can be optically absorptive to the incident light. The wire-grid layer and the absorptive layer can be separated by the dielectric layer. Both the absorptive layer and the dielectric layer(s) can be formed of or can include a dielectric material. In addition, both the absorptive layer and the dielectric layer(s) can have different refractive indices. One of the refractive indices can be greater than the refractive index of the substrate. As described above, the different refractive indices of the layers coupled with the significantly different absorption characteristics of the different dielectric layers is believed to cause the energy in the s-polarized light to be preferentially absorbed in the absorbing dielectric layer and thus to decrease reflection of the s polarized light.

It will be appreciated that different materials are optically transmissive or optically absorptive for different wavelengths of incident light. For visible light applications, the dielectric layer includes a dielectric material that is optically transmissive to visible light, while the absorptive layer includes a material that is optically absorptive to visible light. Similarly, for ultra violet applications, the dielectric layer includes a dielectric material that is optically transmissive to ultra violet light, while the absorptive layer includes a material that is optically absorptive to ultra violet light. Similarly, for infrared applications, the dielectric layer includes a material that is optically transmissive to infrared light, while the absorptive layer includes a material that is optically absorptive to infrared light.

The dielectric layer and the absorptive layer can be formed of or can include a dielectric material. For example, the layers can be formed of: aluminum oxide; antimony trioxide; antimony sulphide; beryllium oxide; bismuth oxide; bismuth triflouride; cadmium sulphide; cadmium telluride; calcium fluoride; ceric oxide; chiolite; cryolite; germanium; hafnium dioxide; lanthanum fluoride; lanthanum oxide; lead chloride; lead fluoride; lead telluride; lithium fluoride; magnesium fluoride; magnesium oxide; neogymium fluoride; neodymium oxide; praseodymium oxide; scandium oxide; silicon; silicon oxide; disilicon trioxide; silicon dioxide; sodium fluoride; tantalum pentoxide; tellurium; titanium dioxide; thallous chloride; yttrium oxide; zinc selenide; zinc sulphide; and zirconium dioxide, and combinations thereof. The film layers can be deposited on the substrate. In the case of metal oxides, they can be deposited by starting with an oxide evaporant material (with additional oxygen backfill as needed). The material, however, can also be deposited by evaporating a base metal, then oxidizing the deposited material with O2 in the background.

In one aspect, the dielectric layer and/or the absorptive layer can be formed of or can include a material selected from: cadmium telluride, germanium, lead telluride, silicon oxide, tellurium, titanium dioxide, silicon, cadmium sulifide, zinc selenide, zinc sulfide, cadmium telluride, germanium, lead telluride, silicon oxide, tellurium, titanium dioxide, silicon, magnesium fluoride, aluminum oxide, cadmium telluride, germanium, non-stoichiometric versions of these material, and combinations thereof. It is believed that cadmium telluride, germanium, lead telluride, silicon oxide, tellurium, titanium dioxide, silicon, cadmium sulifide, zinc selenide, zinc sulfide are appropriate for the ultra-violet range; cadmium telluride, germanium, lead telluride, silicon oxide, tellurium, titanium dioxide, silicon are appropriate for the visible range; and magnesium fluoride, aluminum oxide, cadmium telluride, germanium, and combinations thereof are appropriate for the infrared range.

In another aspect, the dielectric layer and/or the absorptive layer can be formed of or can include a material selected from: silicon nitride, titanium nitride, titanium carbide, silicon carbide, tantalum, cupric oxide, cuprous oxide, cupric chloride, cuprous chloride, cuprous sulfide, titanium, tungsten, niobium oxide, aluminum silicate, boron nitride, boron oxide, tantalum oxide, carbon and combinations thereof.

In addition to the material listed herein, ionic states of the material can also be included, particularly for transition metal oxides, hydrides, nitrides, salts, etc.

Many of the film dielectric materials mentioned above can be deposited using various deposition techniques such as sputtering, Chemical Vapor Deposition (CVD), or evaporation to produce films that are not stoichiometric. This can be used to produce dielectric thin films that have different optical properties than the common bulk stoichiometric material. For example, it is possible to produce a titanium oxide dielectric film by sputtering that is oxygen-starved, and therefore has much higher optical absorption than the standard film. Such a film can be used to produce a wire grid that strongly absorbs one polarization rather than strongly reflecting the same polarization using the present invention.

In a similar manner, it is possible to do the same thing with other metal oxides such as zirconium oxide, magnesium oxide, silicon oxide, etc. Similar effects can also be accomplished with metal fluorides such as magnesium fluoride, with metal nitrides such as silicon nitride, and with metal sulphides, silicides, or selenides.

The thicknesses and materials (or refractive indices) of the film layers can be manipulated to reduce reflection of p polarized light, or (either alternatively or simultaneously) to enhance the absorption of s polarized light, as described in greater detail below.

To amplify on the above discussion about materials, and the importance the particular molecular state, or the stoichiometry of the material, it is useful to recall that stoichiometric reactions are those that maintain an equilibrium with bonding conditions met. However there are additions to specific stoichiometric compounds that need to be considered. For example, ionic states of compounds exist that defy full enumeration. Consider the common compound rust, it can be either Ferric Oxide (Fe2O3-Iron III) or Ferrous Oxide (FeO-Iron II). Note that in some conditions, ferrous Oxide can be considered the non-stoichiometric compound. In our applications, there are various ionic states in which the chemical element can be stable but with different optical properties. Appropriate deposition techniques can therefore produce films of mixed compositions with a variety of optical properties. For example, in the literature there is documentation of TiO2, TiO3 and TiO4 (complexed with various ligands). Aluminum also has an amphoteric nature that is stabilized as an acid or base compound. Inclusion of all forms and applications of all the interesting materials is not practical because the potential list is endless. Generally, the invention can be practiced with a large variety of non-stoichiometric or mixed-state materials that are fabricated to produce the desired absorptive properties. This is a significant degree of freedom that is not typically available when a high-transmission, low-absorption film is desired, because the properties of low-absorption in an optical material are well-known to be coupled with pure, stoichiometric films that are not in a mixed state. Therefore, it is difficult to compile a simple list of materials, or to otherwise define a finite set of materials that work within the scope of the invention. As discussed, with proper fabrication conditions, a wide, almost infinite variety of materials could be defined that will work within the scope of the invention.

Returning now to the figures, one or more of the thin film layers, such as the dielectric layer 30a-c, can include a dielectric grid including an array of non-metal elements 38. The non-metal and metal elements 38 and 26 of the arrays can be oriented substantially parallel with one another. In addition, the arrays can have substantially equal periods and/or widths. In one aspect, the non-metal elements 38 of the dielectric grid and the metal elements 26 are aligned, or the non-metal elements 38 are aligned with the metal elements 26 of the wire grid layer, as shown in FIGS. 1a, 1b, 2 and 3. In another aspect, the non-metal elements 38 of the dielectric grid and the metal elements 26 are off-set, or the non-metal elements 38 are off-set with respect to the metal elements 26 of the wire grid layer, as shown in FIG. 4.

As discussed above, the number, thicknesses t, and materials (or refractive indices) of the thin film layers 18 can be varied to reduce reflection of p polarized light (increase transmission of p polarized light) and/or reduce transmission of s polarized light (increase reflection or absorption of s polarized light). Some of the layers can be uniform in structure and material, while other layers can include grids, such as metal elements 26 of the wire grid layer 22 or non-metal elements 38 of a dielectric grid. Examples of specific configurations and a method of selecting materials and corresponding thicknesses of the absorbing films or ribs are discussed below.

In general, optical material and optical film absorption characteristics can be determined by the optical indices n and k of the material, wherein n is the normal index of refraction, and k is the complex part which represents the absorption behavior of the material in question. When k is essentially zero, then the material is highly transparent or transmissive. In determining the desired absorption characteristics for a specific configuration of the invention, control of the film thickness of the specific material can compensate for various values of the optical parameter k value. Specifically if the k value is lower than desired, the film thickness can be increased to compensate or achieve the desired performance in the polarizer. In like manner, if the k value is higher than desired, the material can still be used with a compensating reduction in the film thickness. Since the exact thicknesses of films will depend on the wavelength range desired in the application, the trade-offs for transmission of the transmitted polarization and absorption of the reflected polarization that meet the need of the specific application, and other application-specific issues, it is impractical to define a simple rule relating the k value to a film thickness. In general, the range of interest for k is between 0.1 and 4.5.

Exemplary k values are shown in Table 1. The table demonstrates selectivity as a function of the k value. From the table, it can be seen that Cadmium Telluride is an example of a single compound that would act in all three band widths. Lead Telluride, Silicon Oxide, Tellurium, Titanium Dioxide and Silicon are compounds that would work in both the Ultra Violet (UV) band width and also the Visible bandwidth. Cadmium Sulfide, Zinc Selenide and Zinc Sulfide are compounds that have functional absorption in only the UV band but not in the visible or Infra Red (IR). Other compounds could be identified that absorb only in the visible band, only in the IR band, or only in the UV band, or various combinations of the 3 optical bands. It will be noted also, that the list presented includes many materials that are not considered as common or "standard" optical materials. This illustrates the new degrees of freedom introduced in the invention by noting that absorbing materials are desirable in practicing the invention. This list is presented to demonstrate possible compound dedication to specific wave bands but is not to be considered all inclusive. Thus, the absorptive material can have a k value between 0.1 to 4.5.

TABLE 1

| Compound | UV (k values) | Visible (k values) | IR (k values) |
|---|---|---|---|
| Cadmium Telluride | 1.739 | 0.406 | 0.23 |
| Germanium | 3.96 | 2.165 | 0.123 |
| Lead Telluride | 1.22 | 5.9 | |
| Silicon Oxide | 1.52 | 0.464 | |
| Tellurium | 1.71 | 5.21 | |
| Titanium Dioxide | 3.19 | 0.251 | |
| Cadmium Sulfide | 1.64 | | |
| Zinc Selenide | 1.421 | | |
| Zinc Sulfide | 0.54 | | |

The film layers can extend continuously across the substrate 14, and can be homogeneous, consistent or constant layers in at least two directions, or both parallel to the wires and orthogonal to the wires.

Referring to FIG. 1a, a selectively absorptive, multilayer wire-grid polarizer 10a is shown. The polarizer 10a includes a wire-grid layer or wire-grid 22 disposed on a substrate 14, and three film layers 30a, 34a and 30b disposed over the wire-grid. The wire-grid 22 can include elements or wires 26 formed of aluminum. The substrate can be glass (BK7). The three film layers are disposed over or on the wire-grid layer 22. The three film layers can be discontinuous to form dielectric grids. One of the film layers 30a is disposed on the wire-grid layer 22 can be formed of an optically transmissive material with respect to the incident light, defining a dielectric layer. Another film layer 34a is disposed on the dielectric layer 30a and includes an optically absorptive material with respect to the incident light, defining an absorptive layer. Another film layer 30b is disposed on the absorptive layer 34a and includes an optically transmissive material with respect to the incident light, defining another dielectric layer.

The polarizer 10a can be configured for use with visible incident light (400-700 nm). The thickness or height $t_{wg}$ of the elements 26 of the wire-grid can be 160 nm. The first dielectric layer or grid 30a can have a thickness $t_1$ of 100 nm, and can be formed of silicon oxide (SiO2), with an index of refraction $n_s$ of 1.45. The absorptive layer or grid 34a can also have a thickness $t_2$ of 100 nm, and can be formed of an optically absorptive material with respect to visible light with an index of refraction $n_2$ of 2.5. The period P of the grids can be 144 nm. The width of the elements can be 45% of the period P, or 57 nm. The light 12 can be incident at 45 degrees.

Such a polarizer 10a can be formed by depositing the layers of aluminum, silicon dioxide, absorptive material, and silicon dioxide, and then etching the layers to form the ribs and wires.

The performance of the polarizer 10a of FIG. 1a is compared to a similar polarizer without dielectric grids on top and the reflected s polarization is substantially less with the polarizer 10a and the transmitted p polarization is also greater with the polarizer 10a. Because the period P of the grids is less than the wavelength of visible light, they all essentially behave as thin films.

Referring to FIG. 1b, another selectively absorptive, multilayer wire-grid polarizer 10b is shown that is similar in most respects to the polarizer 10a of FIG. 1a. In addition, the polarizer 10b includes grooves 50 etched in the substrate 14b to form ribs 54 extending therefrom. The wires 26 of the wire-grid layer 22 can be supported on the ribs 54, and thus can have the same period. Such a polarizer can be formed by over etching the above layers to etch the grooves into the substrate.

Referring to FIG. 2, another selectively absorptive, multi-layer wire-grid polarizer 10c is shown that is similar in most respects to those described above. In addition, the polarizer 10c has the absorptive layer 34b and the dielectric layer 30c disposed between the wire-grid layer 22 and the substrate 14.

Referring to FIGS. 3 and 4, other selectively absorptive, multilayer wire-grid polarizers 10d and 10e are shown that are similar in most respect to those described above. In addition, the polarizers 10d and 10e have other film layers disposed above and below the wire-grid layer 22.

Figure 5:
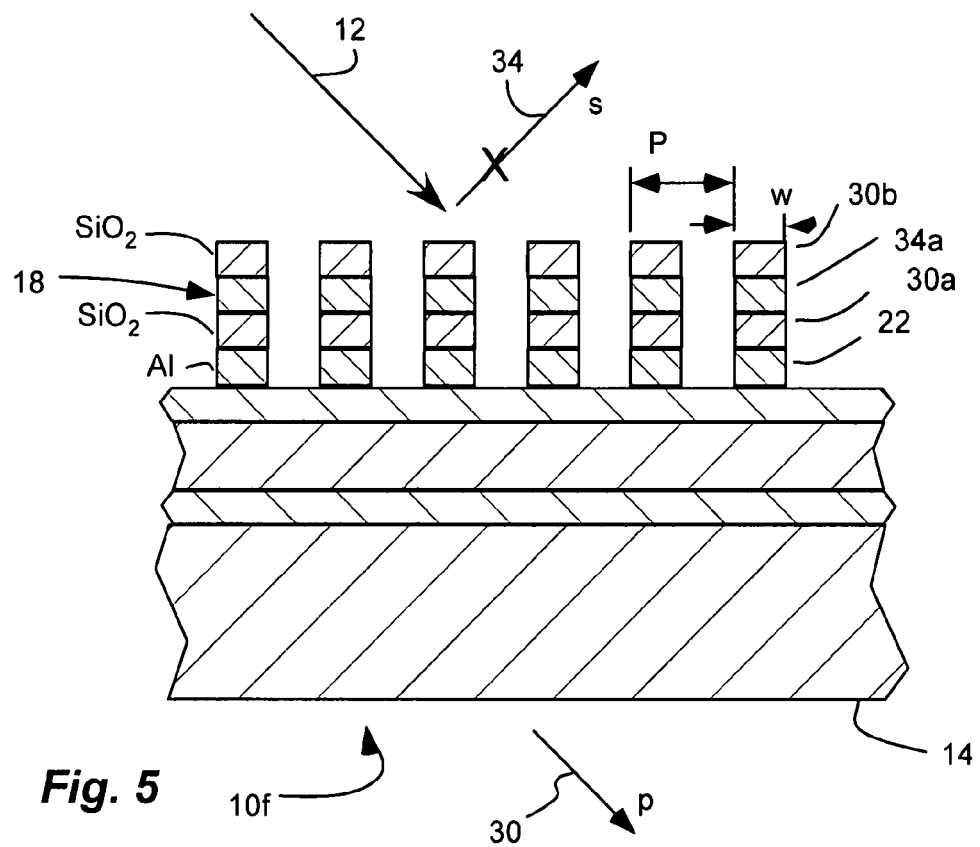
FIG. 5 is a cross-sectional side schematic view of another selectively absorptive, multilayer wire grid polarizer in accordance with another embodiment of the present invention (the figures are not to scale and features are shown greatly exaggerated for clarity).

Referring to FIG. 5, another selectively absorptive, multi-layer wire-grid polarizer 10f is shown that is similar in many respects to the polarizer 10a shown in FIG. 1a. In addition, the polarizer includes at least three layers disposed between the substrate 14 and the wire-grid layer 22.

The examples presented here are but a few of the many possibilities that may be realized from this invention. In general, a combination of uniform layers and dielectric grids may be designed for specific applications such as optimizing transmittance or reflectance over a given range of incident angles for a given band of light. Also, a combination of uniform layers and dielectric grids may be designed for specific applications such as optimizing transmittance or one polarization and absorption of the orthogonal polarization over a given range of incident angles for a given band of light. Optimization may be made for transmittance or reflectance; for transmittance or absorption, or for some combination of the characteristics together. Optimization may be made for incidence from the air side on the polarizer or from the substrate side or both.

Various aspects of wire-grid polarizers, optical trains and/or projection/display systems are shown in U.S. Pat. Nos. 5,986,730; 6,081,376; 6,122,103; 6,208,463; 6,243,199; 6,288,840; 6,348,995; 6,108,131; 6,452,724; 6,710,921; 6,234,634; 6,447,120; and 6,666,556, which are herein incorporated by reference.

Although the wire-grid polarizers have been illustrated as facing the light source, or with the elongated elements facing towards the light source, it is understood that this is for illustrational purposes only. Those skilled in the art will appreciate that the wire-grid polarizers can be oriented to face towards imaging bearing beams, such as from a liquid crystal array, for the simple purpose of avoiding passing the image bearing beam through the substrate, and thus avoiding ghost images or multiple reflections associated with light passing through mediums, such as the substrate. Such configurations may result in the wire-grid polarizer facing away from the light source.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A selectively absorptive wire-grid polarizer device for polarizing incident light and selectively absorbing one polarization, the device comprising:
   a) a substrate;
   b) at least two thin film layers, disposed over the substrate, the film layers having different refractive indices with respect to one another and each having a thickness less than 170 nm;
   c) the refractive index of at least one of the two film layers being greater than a refractive index of the substrate; and
   d) a wire-grid layer, disposed over the substrate, the wire-grid layer including an array of elongated metal elements having lengths longer than a wavelength of the incident light and a period less than half the wavelength of the incident light; and
   e) at least one of the film layers including a material which is optically absorptive of the incident light defining an absorptive layer such that one polarization is substantially absorbed.

2. A device in accordance with claim 1, wherein the at least two film layers includes at least three continuous film layers disposed between the substrate and the wire-grid layer.

3. A device in accordance with claim 1, wherein the at least two film layers includes a dielectric grid disposed between the substrate and the wire-grid layer with an array of dielectric ribs, the metal elements of the wire-grid layer and the dielectric ribs of the dielectric grid being oriented substantially parallel with one another and having substantially equal periods.

4. A device in accordance with claim 1, wherein the at least two film layers includes a dielectric layer disposed over the wire-grid layer with an array of dielectric ribs, and a continuous film layer disposed between the wire-grid layer and the dielectric layer and being continuous in a direction orthogonal to the ribs.

5. A device in accordance with claim 1, wherein the at least two film layers are discontinuous to form an array of parallel ribs oriented parallel with the elements of the wire-grid layer.

6. A device in accordance with claim 1, wherein the at least two film layers include a material selected from the group consisting of: metal oxides, metal nitrides, metal fluorides, metal selenides, and metal sulphides that have been deposited to be non-stoichiometric, and combinations thereof.

7. A device in accordance with claim 1, wherein the absorptive layer includes a dielectric grid including an array of non-metal elements, the non-metal and metal elements of the arrays being oriented substantially parallel with one another, and the arrays having substantially equal periods.

8. A device in accordance with claim 7, wherein non-metal elements of the dielectric grid are aligned below the metal elements of the wire grid layer.

9. A device in accordance with claim 7, wherein non-metal elements of the dielectric grid are off-set below the metal elements of the wire grid layer.

10. A device in accordance with claim 7, wherein non-metal elements of the dielectric grid are aligned above the metal elements of the wire grid layer.

11. A device in accordance with claim 7, wherein non-metal elements of the dielectric grid are off-set above the metal elements of the wire grid layer.

12. A device in accordance with claim 7, wherein the material of the absorptive layer is selected from the group consisting of: silicon nitride, titanium nitride, titanium carbide, silicon carbide, tantalum, cupric oxide, cuprous oxide, cupric chloride, cuprous chloride, cuprous sulfide, titanium, tungsten, niobium oxide, aluminum silicate, boron nitride, boron oxide, tantalum oxide, carbon and combinations thereof.

13. A device in accordance with claim 7, wherein the material of the absorptive layer has an optical parameter k value between 0.1 and 4.5.

14. A device in accordance with claim 1, wherein absorptive thin film layer has a thickness less than 150 nm.

15. A device in accordance with claim 1, wherein absorptive thin film layer has a thickness less than 100 nm.

16. A device in accordance with claim 1, wherein the wire-grid layer and the at least two film layers in combination define an array of ribs, wherein a width of an individual rib is approximately the same at a base of the individual rib as at a top of the individual rib.

17. A device in accordance with claim 1, wherein the wire grid layer and the at least two film layers in combination define an array of ribs with gaps therebetween, wherein a distance between ribs at a base of the ribs is approximately the same as a distance between the ribs at a top of the ribs.

18. A divice in accordance with claim 1, wherein the elongated metal elements comprise aluminum; the at least two film layers comprises at least three film layers; at least one of the at least three film layers comprises silicon dioxide; another at least one of the least three film layers comprises silicon; and another at least one of the at least three film layers comprises tantlaum.

19. A selectively absorptive wire-grid polarizer device for polarizing incident light and selectively absorbing one polarization, the device comprising:
   a) a substrate having a refractive index;
   b) a polarizing wire-grid layer disposed over the substrate having an array of parallel metal wires with a period less than half the wavelength of the incident light;
   c) a dielectric layer disposed over the substrate including a dielectric material; and
   d) an absorptive thin film layer disposed over the substrate including a material which is optically absorptive of the incident light such that one polarization is substantially absorbed and having a refractive index different than a refractive index of the dielectric layer and a thickness less than 170 nm.

20. A device in accordance with claim 19, further comprising at least three continuous film layers disposed between the substrate and the wire-grid layer, the continuous film layers being continuous in a direction orthogonal to the wires.

21. A device in accordance with claim 19, wherein the device selectively absorbs light within the visible spectrum; wherein the period of the array of elements of the wire-grid layer is less than 350 nm; and wherein the material of the absorptive layer includes a material that is optically absorptive of light in the visible spectrum.

22. A device in accordance with claim 19, wherein the device selectively absorbs light within the ultra violet spectrum; wherein the period of the array of elements of the wire-grid layer is less than 200 nm; and wherein the material of the absorptive layer includes a material that is optically absorptive of light in the ultra violet spectrum.

23. A device in accordance with claim 19, wherein the device selectively absorbs light within the infrared spectrum; wherein the period of the array of elements of the wire-grid layer is less than 500 nm; and wherein the material of the absorptive layer includes a material that is optically absorptive of light in the infrared spectrum.

24. A device in accordance with claim 19, wherein the dielectric layer and the absorptive layer are each discontinuous to form an array of ribs with the ribs being parallel and aligned with the wires of the wire-grid layer.

25. A device in accordance with claim 19, wherein the material of the absorptive layer is selected from the group consisting of: silicon nitride, titanium nitride, titanium carbide, silicon carbide, tantalum, cupric oxide, cuprous oxide, cupric chloride, cuprous chloride, cuprous sulfide, titanium, tungsten, niobium oxide, aluminum silicate, boron nitride, boron oxide, tantalum oxide, carbon and combinations thereof.

26. A device in accordance with claim 19, wherein absorptive thin film layer has a thickness less than 100 nm.

27. A device in accordance with claim 19, wherein absorptive thin film layer has a thickness less than 50 nm.

28. A device in accordance with claim 19, wherein absorptive thin film layer has a thickness less than 10 nm.

29. A selectively absorptive wire-grid polarizer device for polarizing incident light and selectively absorbing one polarization, the device comprising:
   a) a substrate having a refractive index;
   b) at least three different thin film layers each having a thickness less than 170 nm and disposed over the substrate, including:
      i) a polarizing layer including a conductive material;
      ii) an absorptive layer having a refractive index greater than a refractive index of the substrate and including a material that is optically absorptive to the incident light; and
      iii) a dielectric layer having a refractive index different than the refractive index of the absorptive layer; and
   c) the at least three layers being discontinuous to form an array of parallel ribs having a period less than a wavelength of the incident light.

30. A selectively absorptive wire-grid polarizer device for polarizing incident light and selectively absorbing one polarization, the device comprising:

a) a substrate;
b) a wire-grid layer, disposed over the substrate, the wire-grid layer including an array of elongated metal elements having lengths longer than a wavelength of the incident light and a period less than half the wavelength of the incident light; and
c) at least two thin film layers, disposed over the wire-grid layer, the film layers having different refractive indices with respect to one another and each having a thickness less than 170 nm, wherein the refractive index of at least one of the two film layers is greater than a refractive index of the substrate and at least one of the film layers includes a material which is optically absorptive of the incident light defining an absorptive layer such that one polarization is substantially absorbed.

31. A device in accordance with claim 30, further comprising grooves etched in the substrate to from ribs extending therefrom, wherein the wire-grid layer is supported on the ribs.

32. A device in accordance with claim 30, wherein:
the elongated metal elements comprise aluminum;
at least two of the at least two film layers comprises silicon.

33. A device in accordance with claim 32, wherein at least one of the at least two film layers comprises silicon dioxide.

* * * * *